May 27, 1930. G. G. MÜLLER 1,760,767
ILLUMINATING STRUCTURE
Filed June 23, 1928 2 Sheets-Sheet 1
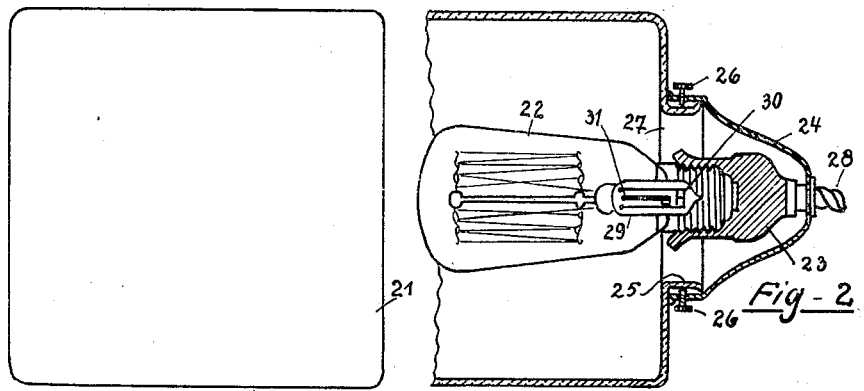
Fig-1. Fig-5.
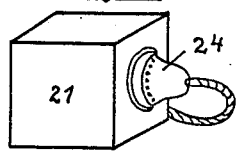 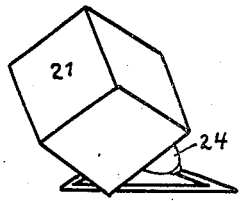 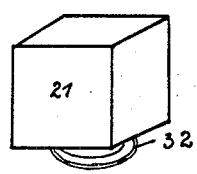
Fig-3. Fig-4.
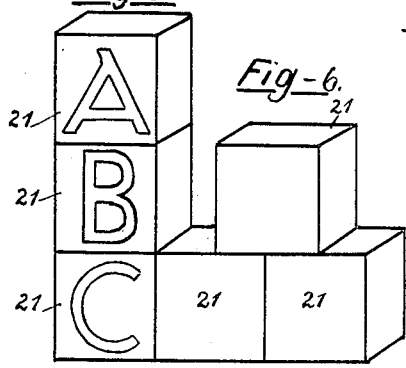 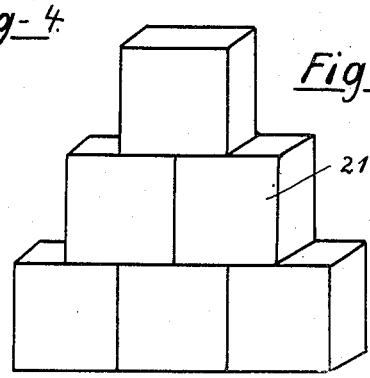
Fig-6. Fig-7.
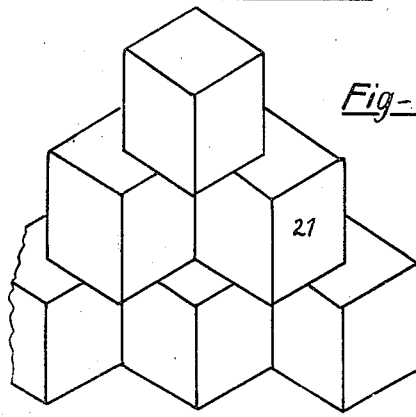 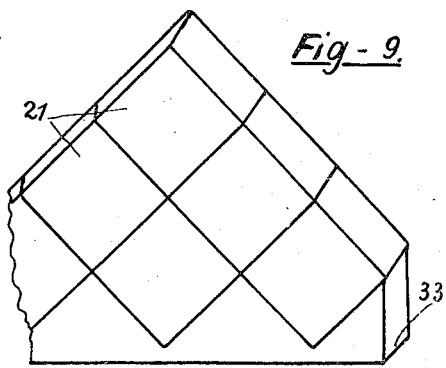
Fig-8. Fig-9.

May 27, 1930.  G. G. MÜLLER  1,760,767
ILLUMINATING STRUCTURE
Filed June 23, 1928  2 Sheets-Sheet 2
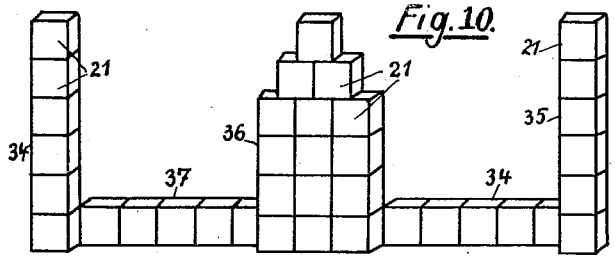
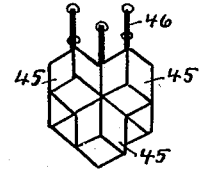
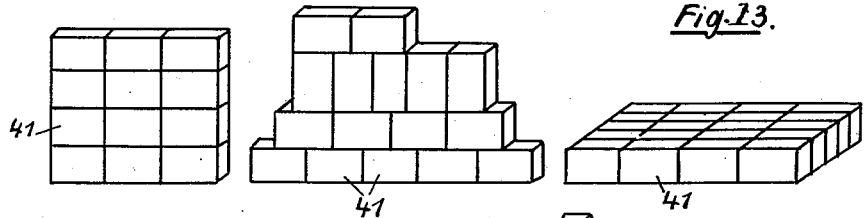
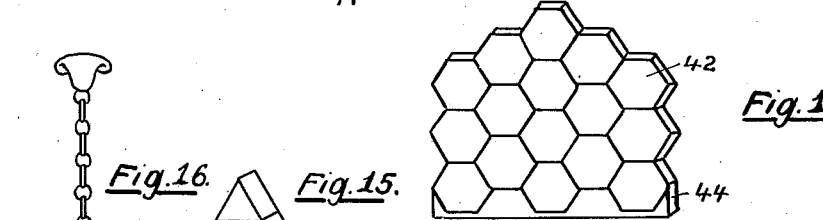
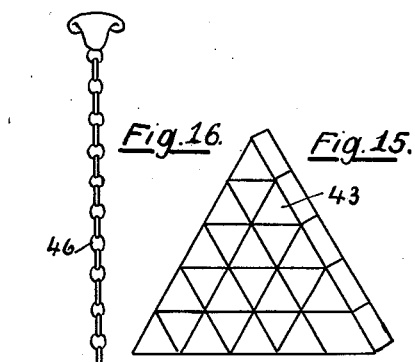
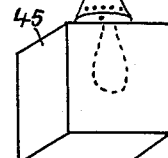
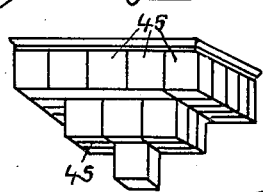
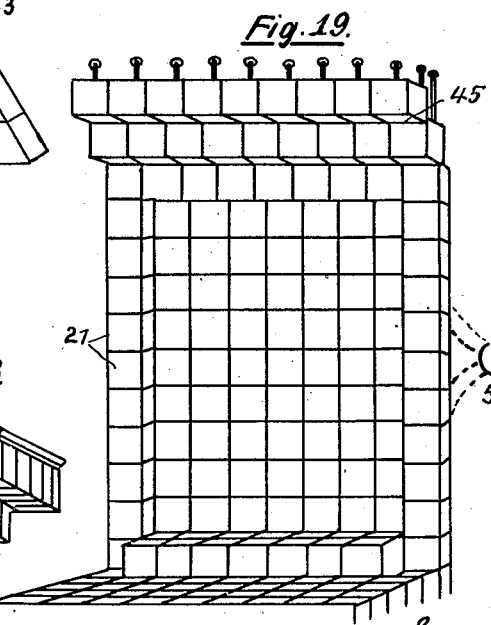
Inventor,
Georg Guido Müller
by Frank A. Appleman, attorney Patented May 27, 1930

1,760,767

UNITED STATES PATENT OFFICE

GEORG GUIDO MÜLLER, OF BERLIN-WILMERSDORF, GERMANY; FLORA MÜLLER, INHERITRESS OF SAID GEORG GUIDO MÜLLER, DECEASED, ASSIGNOR TO ATRAX GESELLSCHAFT MIT BESCHRANKTER HAFTUNG, OF BERLIN, GERMANY, A CORPORATION OF GERMANY

ILLUMINATING STRUCTURE

Application filed June 23, 1928, Serial No. 287,678, and in Germany September 3, 1927.

This invention refers broadly to illuminating means which may be united into any desired aggregates like constructional units and which among other uses may be employed for show and advertising purposes, thereby providing means of obtaining very striking and varying effects by providing different combinations of the illuminating units which constitute the subject of this invention. Such units are preferably illuminated by electric lighting means and comprise a hollow body of one piece of glass or other transparent, translucent or light-permeable material and each unit is provided interiorly with one or more sources of light, as electric incandescent lamps disposed, so as to light the walls of the unit which may be provided with pictorial representations or signs or any desired kind of reproductions, advertising matter or the like. The transparent or translucent hollow enclosure and unit surrounds the source of light which is carried thereby and said unit may be placed in either an upright or horizontal position. The source of light may, if desired, be connected to a switch of any desired construction such as a thermo-switch or the like. Moreover with the arrangement according to this invention there is a very advantageous utilization of the light, inasmuch as the hollow body of glass and the like is thoroughly lighted from the inside by the incandescent light and if desired, a reflecting coat may be provided upon a portion of the wall of the glass body for the purpose of increasing the illumination of the advertising or reproductive matter.

In the accompanying drawings,—

Figure 1 is an end elevation of a rectangular unit;

Figure 2 is a sectional view of such a unit, showing an incandescent lamp, switch, lamp socket, and means for holding the aforesaid parts in engagement with the unit;

Figure 3 illustrates a perspective view of one of the structural units;

Figures 4 and 5 illustrate perspective views of modified forms of the structural units; and Figures 6 to 19 illustrate detail views showing different modifications of structures embodying the units.

The structural unit illustrated is preferably made of translucent material, the sides being plane surfaces 21, the corners being exteriorly convex and interiorly concave, and one of the surfaces has a circular opening which is surrounded by an outwardly extending concavo-convex flange to provide for the insertion and retention of electric illuminating means and the attachment of the socket of the lamp enclosing unit.

Figure 1 of the drawings shows the front of a cube-like unit having its sides connected by rounded margins, the face 21 having applied thereto a character, figure, or letter. The sides of each unit in accordance with my invention are joined or connected by a concavo-convex margin to avoid right angled joints of the sides, and the rear side of each unit has an opening 27 with a curved and outwardly extending integral flange 25 with which engage set screws 26 of a spider 24 with which is associated a socket 23 for an electric lamp 22, which lamp may have a flasher 29 comprising a current maker and breaker 31, and a contact 30 that is connected to the cord 28. The cord 28 may serve as means for suspending a translucent casing where an individual unit is used for display purposes, or a support may be attached to the spider frame 24, as illustrated by Figs. 4 and 16, or the unit may be supplied with a supporting base, and it will be noted that the characters may be applied as desired to different sides or faces.

In Figures 16 and 17, the suspending means 46 will be of an ornamental nature and the sides 45 will have thereon display characters.

Figures 6 to 9 show cube shaped units, the faces or sides 21 thereof being provided with characters, as letters, figures, or pictures, which may be molded in or attached to the translucent face, and such units may be incorporated into a structure made up of solid blocks as 34 to 37 of Fig. 10, where illuminated blocks 21 may be maintained in various positions.

Figures 16, 17 and 19 show modifications of the invention wherein the lamp containers may be arranged in groups, or in rows, and supplied with current to illuminate the units, with wires or suspending means maintaining the units 45 in position, relative to the structure with which they are combined, and when a plurality of units is employed, the lamps of each unit are connected to a switch 50.

In practice the lamp box or container will be made of porcelain or other translucent material in one piece, so as to avoid the use of metallic or other opaque frames, and the thickness of the wall of the lamp casing is such as to have sufficient strength as to withstand and maintain building units with which the lamp containers may be associated, and by avoiding angular jointures the units will be able to withstand greater pressure than if the sides were connected at right angles. I also avoid refraction at the junctures of the sides and the use of frames which are objectionable as they cast shadows.

The illuminating body according to this invention may also be employed as a constructional element for the building up of composite illuminating units of larger shape. For this purpose the hollow illuminating element of transparent glass or the like and containing an electric source of light may be given the shape of a cube or a prism of three or more sides, or it may assume any other polyhedric constructional shape which admits of its stability by being supported on a plane surface and its union with other bodies of equal shape. By the building up of an aggregate of several such illuminating bodies combined the most varied illuminating constructional shapes may be obtained as in the case of the building up of ordinary constructional bricks. Thus for instance, by means of interiorly lighted hollow glass bodies of cube-shape it is possible by merely placing such cubes side by side or on top of each other to obtain for instance pillars, columns, walls, steps, pyramids and other structures which produce an illuminating action on the entire outer surface and by this means novel upright or pendently supported lighting bodies may be obtained. The several hollow elements may be provided with portions of advertising or instructive matter, thus for instance with a letter of an inscription which, when the several elements are united will become visible in its entire extent. According to another utilization of the invention the different suitably assembled hollow glass bodies may be illuminated and respectively darkened in any suitable or predetermined succession or alternation by connecting their electric lighting elements to a correspondingly arranged switching and controlling member. Moreover, by using hollow bodies of colored glass or colored sources of light it is possible to produce uni-colored or differently colored illuminating bodies by a combination of these constructional elements which moreover by means of a suitable switch may be selectively illuminated singly or in groups, so as to obtain the most variegated combinations and illusions of colors.

Having thus set forth the invention, I claim:

1. An illuminating body for advertising purposes comprising a structure composed of brick-like elements of substantially equal shape and size, characterized in that each of said elements consists of a single piece of light transparent material of the shape of a hollow polyhedron whose lateral faces are alike and whose edges at the junction of the lateral faces are convexed in order that a variety of possibilities for assembling the bodies is inherent in the structure of each body, and means for illuminating each body.

2. An illuminating body for advertising purposes comprising a structure composed of brick-like elements of substantially equal shape and size, characterized in that each of said elements consists of a single piece of light transparent material of the shape of a hollow polyhedron whose lateral faces are alike, and means for illuminating each body.

3. An element for an illuminating structure consisting of a single piece of light transparent material shaped like a hollow polyhedron whose lateral faces with the exception of one which is apertured for the reception of an illuminating means are exactly alike, the said surfaces or any of them being intended to display advertising matter and adapted to be assembled with other elements whereby the light from one element illuminates the other element without resultant shadows due to the juxtaposed locations of the elements.

In testimony whereof I affix my signature.

GEORG GUIDO MÜLLER.